3,493,689

SWITCHING MATRIX AND CONTROL SYSTEM FOR TELEPHONE EXCHANGE INSTALLATION

Heinz Mertel, Hohenschaftlarn, near Munich, and Roman Adler and Gunther Lohr, Munich, Germany, assignors to Siemens Aktiengesellschaft, Munich, Germany Filed Aug. 2, 1966, Ser. No. 569,634
Claims priority, application Germany, Aug. 25, 1965, S 99,038
Int. Cl. H04m 3/00
U.S. Cl. 179—18 9 Claims

ABSTRACT OF THE DISCLOSURE

An exchange system having a switching matrix over which connections are established after extensive pathfinding operations. The switching matrix is subdivided into partial switching matrices, to each of which a control system is individually assigned. A common assignment means selects the control systems which are to participate in the establishment of the connection, in each case.

GENERAL DESCRIPTION

Figure 1:
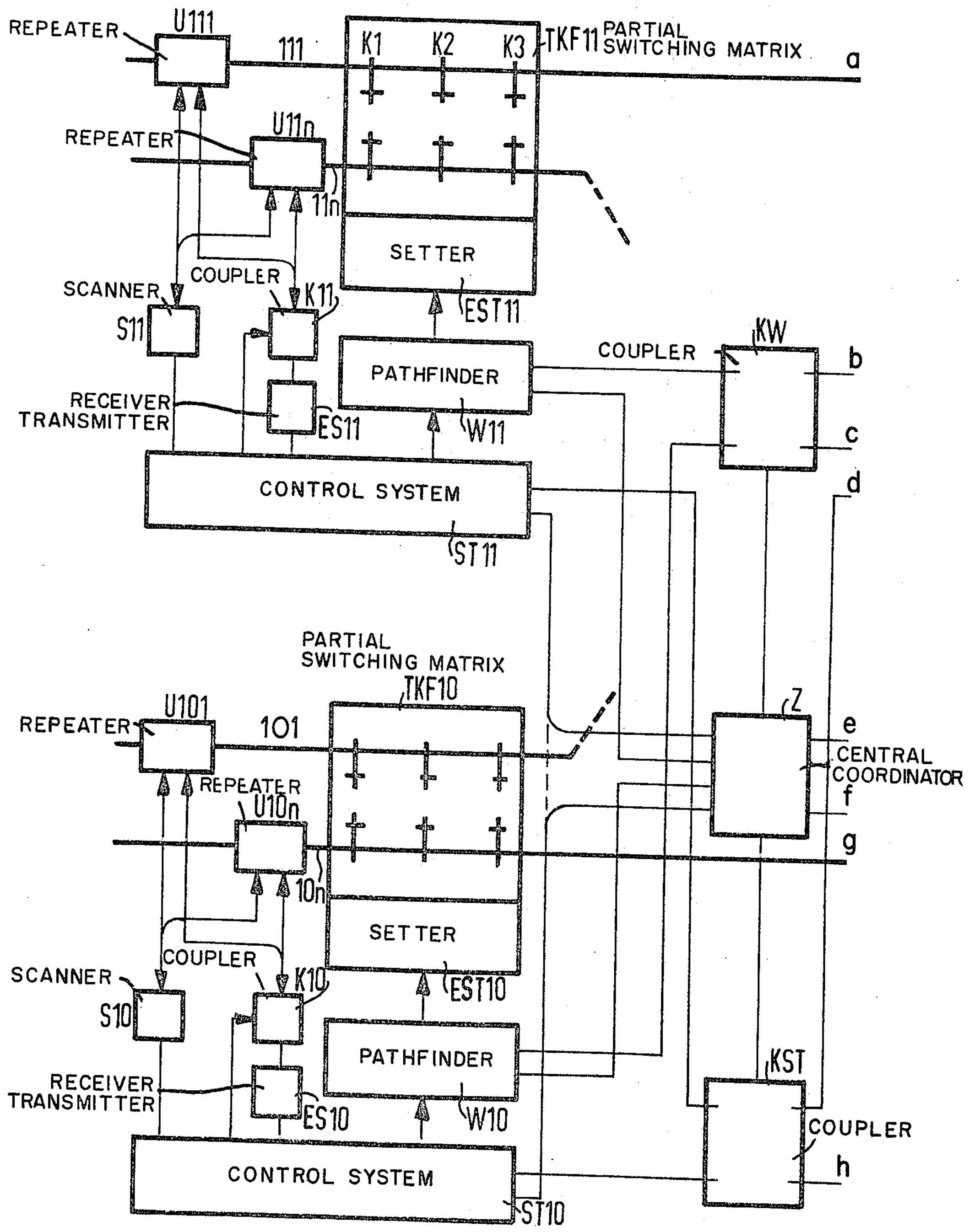

This invention relates to a switching matrix and control system for a telephone exchange installation and, more particularly, to a switching matrix and control system performing pathfinding operations and permitting additions to the installation for changing the load handling capabilities thereof while providing simplified control of the system.

In accordance with the invention, the switching matrix has a plurality of input terminals and a plurality of output terminals. By way of example, connection lines to subscriber stations may be connected to the input terminals and external lines providing for connection to other subscribers or to remote exchange installations may be connected to the output terminals. The installation provides for establishing coupling connections, by a pathfinding operation, through the matrix from an input terminal corresponding to a calling subscriber to an output terminal corresponding to the appropriate external line for completing a call connection.

The switching matrix of the invention comprises a plurality of partial switching matrices arranged in a first group connected to the input terminals and a second group connected to the output terminals, each of the first and second groups including a plurality of partial switching matrices. An individual control system is assigned to each partial switching matrix.

A central coordinator is assigned in common to the plurality of individual control systems. The pathfinding operation is performed to determine the available coupling connections and to select an appropriate coupling connection through the matrix for completing a call connection.

The composite switching matrix comprising the plurality of partial switching matrices and the individually assigned control systems, in accordance with the invention, simplifies the construction and operation of telephone exchange installations in acccrdance with desired load handling capabilities, and greatly facilitates modifications of existing installations to increase the load handling capability. Regardless of the size of a given installation, and even when the size is increased in accordance with modification thereof permitted by the invention, the required operating speed of the control system for completing call connections through the installation is maintained, even in the case of heavy load requirements on the installation. Such heavy load requirements occur particularly in long distance exchange installations and also in extension stations. Regardless of the size or load handling capacity of a given installation constructed in accordance with the invention, however, the advantages of the pathfinding operation and the simultaneous completion of connections through all coupling paths required for establishing a call connection are maintained. By contrast, the operating speeds of prior art dial registration and setting systems providing such operations are deleteriously affected by heavy load requirements.

In accordance with the invention, the control systems assigned to the partial switching matrices, in addition to controlling the pathfinding operation, also may supervise the condition of transmission line repeaters associated with the connection lines assigned to the inlet and outlet terminals of the matrix. The control systems may also supervise and control the receipt of transmission of data, such as dial information codes or the like, which are necessary for establishing a call connection or for terminating a previously established call connection. As a result, the central control system of the installation may be significantly reduced in complexity, affording simplified and efficient operation.

In accordance with a further embodiment of the invention, the control systems assigned to successive partial switching matrices, i.e. matrices arranged in succession in the direction of coupling circuit between inlet and outlet terminals of the composite matrix, may be selectively connected together over a coupler. The connection of two such successive control systems over a coupler is very advantageous, in that, while they are engaged in performing to pathfinding for establishing a call connection, or for terminating a previously established call connection, other control systems corresponding to other successive partial switching matrices may exchange or transfer data which is to be transmitted through the installation from inlet to outlet, or from outlet to inlet terminals thereof.

In accordance with a further alternative embodiment of the invention, the pathfinding may be effected in a pathfinding register rather than in a pathfinding network. The employment of pathfinding registers effects a considerable saving in time for performing the pathfinding function, in addition to permitting simultaneous performance of two or more pathfinding operations.

STATE OF THE PRIOR ART

Telephone exchange installations providing for establishment of call connections and termination of previously established connections over a switching matrix including controls for performing pathfinding are well-known in the art. In such installations, there is typically provided a switching matrix having associated therewith inlet and outlet terminals to which are connected connection lines over which information is received or transmitted. Typically, the connection lines connected to the inlet terminals of the switching matrix comprise subscriber lines which in turn are connected to subscriber circuits, and the lines connected to the outlet terminals comprise external lines which are connected to remote installations, such as for completing long distance call connections to remote subscribers. Transmission line repeaters are included in both the subscriber and the external connection lines.

A first control system of the installation is assigned to the subscriber lines and their associated transmission line repeaters connected at the input terminals of the switching matrix. A second control system is provided for controlling the operation of the switching matrix. A third control system is provided for responding to and controlling the transmission of information over the external lines connected to the output terminals of the matrix and their associated transmission line repeaters.

The operation of such prior art telephone exchange installations typically proceeds in the following manner. The first control system responds to information received from a subscriber connection line and representing a request or demand for the establishment of a call connection. The first control system converts or commutates the information thus received and commands the second control system to find a path through the switching matrix for completing a call coupling connection corresponding to that required by the call connection demand. The second control system may also respond to the command to actuate the third control system for transmitting the information to the external line for completing the call connection.

In such a prior art system, the second control system assigned to the switching matrix typically is utilized for effecting the exchange of data or information, for example, dial termination or end signals, dial code initiation signals, and the like, between the connection lines participating in the call connection. In such a system, there is provided a connection register which registers information identifying the inlet and outlet terminals of the matrix and the coupling path established therebetween for a given call connection. The information exchange function therefore requires, for each call connection, that the coupling path and the inlet and outlet terminals for a given call connection be determined. In such prior art systems, therefore, connection registers are required not only for the pathfinding function but also for the transmission of information through the switching matrix and between the particular inlet and outlet terminals associated with a given call connection.

The foregoing prior art exchange installations have been employed primarily for local exchange offices or local networks. The traffic load requirements of such local exchange installations are much lower than those normally experienced in long distance telephone installations. In long distance exchange installations, there is frequently imposed a requirement of a much higher operating speed or operating frequency, in addition to a much higher load handling requirement resulting from a considerably larger number of requests placed upon the control systems of the installation. The enlargement or expansion of such prior art installations, whether employed for local or long distance exchanges, is very difficult and impedes such usage thereof, particularly due to the greatly different levels of load handling capabilities required for different exchange installations.

OBJECTS OF THE INVENTION

It is therefore an object of this invention to provide an improved switching matrix and control system for telephone exchange installations.

Another object of this invention is to provide an improved switching matrix and control system for a telephone installation and comprising a plurality of partial switching matrices having individually assigned control systems and a central control system including central couplers for coordinating the operation of the individual control systems assigned to the plurality of partial switching matrices.

Still a further object of this invention is to provide a composite switching matrix and control system for a telephone exchange installation and comprising a plurality of partial switching matrices each having an individually assigned control system wherein interchangeable operation of the individually assigned control systems is provided.

Still another object of this invention is to provide an improved telephone exchange installation having a plurality of partial switching matrices with individually assigned control systems and a central control system and operable to effect simultaneous pathfinding operations for establishing and terminating call connections through the installation.

DETAILED DESCRIPTION OF THE INVENTION

Figure 2:
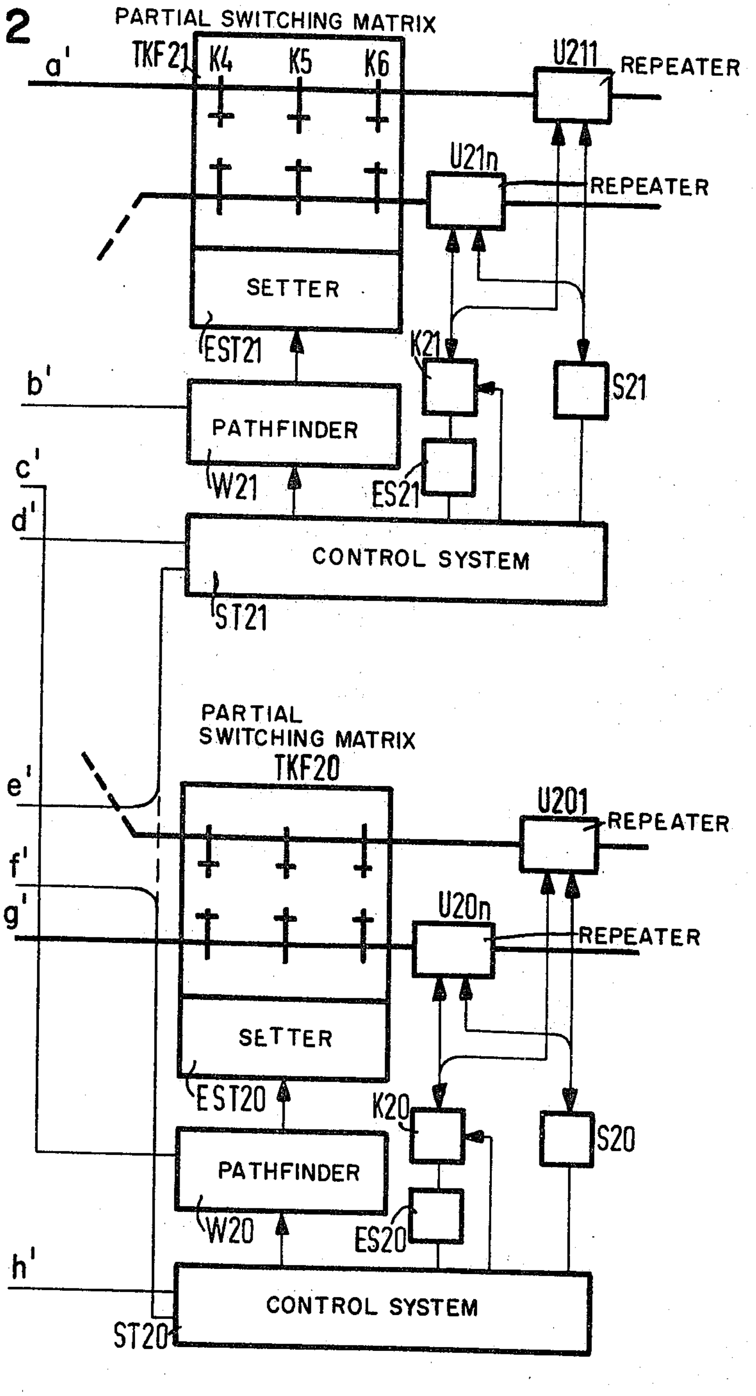

The telephone exchange installation of the invention is set forth for clarity in presentation on two separate sheets of drawings identified as FIGS. 1 and 2. The interconnection of the system portions, as set forth in FIGS. 1 and 2, is indicated at the right and left hand margins of FIGS. 1 and 2 respectively, the lines of FIG. 2 common to those of FIG. 1 being labelled by identical, but primed letters. Unless otherwise indicated, reference to the elements of the drawing will be made concurrently to FIGS. 1 and 2.

The installation of the invention is shown in an embodiment including a six-stage switching matrix, the switching stages being labelled K1, K2 . . . K6. The switching matrix is divided into two groups of partial switching matrices, the first group of partial switching matrices, TKF11 to TKF10, including stages K1, K2, and K3 and the second group of partial switching matrices, TKF21 to TKF20, including the stages K4, K5, and K6. The number of partial switching matrices in each group thereof and the number of stages in each group may be greater than that indicated, and depends on the load handling requirements of a given installation.

A control system is individually assigned to each of the partial switching matrices. For example, control system ST11 is assigned to the partial switching matrix TKF11. Similarly, the control systems ST10, ST21, and ST20 are assigned to the partial switching matrices TKF10, TKF21, and TKF20, respectively. The other systems associated with each partial switching matrix are similarly identified by corresponding numerical suffixes. Reference therefore will be had to the partial switching matrix TKF11. There is further assigned to each partial switching matrix, such as TKF11, a pathfinder W11, a coupler K11, a receiver-transmitter ES11, and a scanner S11. Although a plurality of input terminals are provided for each partial switching matrix in a practical application of the system of the invention, in FIG. 1, each of the partial switching matrices TKF11 to TKF20 are shown, for purposes of clarity in presentation, to include only two such input terminals. Connection lines are shown connected to the input and output terminals of the matrices; for example, connection lines 111 and **11*n* are connected to matrix TKF11 and connection lines 101 and 10*n* are connected to matrix TKF10. Repeaters U111 and U11*n* are connected in the connection lines 111 and 11*n*, respectively. The input lines to the repeaters U111 and U11*n*** typically provide connection to subscriber stations.

The control system ST11 controls the function and operation of the pathfinder W11 and supervises, by means of the scanner S11, the condition of the transmission line repeaters U111 and **U11*n*. The control system ST11, in addition, supervises the receipt and emission of data over the connection lines 111 and 11*n* associated with the partial switching matrix TKF11. The transmission line repeaters U111 and U11*n* are connected to the coupler K11 which may selectively switch a given one of the transmission line repeaters U111 and U11*n* to a receiver-transmitter ES11**.

As noted previously, the connection lines 111 to **10*n* connected to the first group of partial switching matrices, including the matrices TKF11 and TKF10, are connected to subscriber stations associated with the installation. The transmission line repeaters U111 to U10*n* may therefore be designated as receiving repeaters. By contrast, the second group of partial switching matrices TKF21 and TKF20 are associated with external connection lines providing connection to remote exchange installations. The associated transmission line repeaters U211 to U20*n*** therefore may be designated as transmitting repeaters for transmitting information over the external lines.

The central control system of the installation of the invention is shown on the sheet designated FIG. 1. The central control system includes a coupler KST, a central coordinator Z, and a coupler KW.

The control systems ST11 to ST10 of the partial switching matrices TKF11 to TKF10 of the first group may be switched together over the coupler KST with the control systems ST21 to ST20 of the partial switching matrices TKF21 to TKF20 of the second group thereof. The coupler KW similarly provides for the coupling or switching together of the pathfinders W11 to W10 of the first group of partial switching matrices with the pathfinders W21 to W20 of the second group. The couplers KST and KW may be constructed as a single coupler, if desired, and be of any suitable design for effecting the aforedescribed coupling function.

The central coordinator Z controls the aforedescribed coupling of the pathfinders and control systems of the various partial switching matrices after determining the required coupling paths for completing a demanded call connection. The determination is effected in accordance with the received dial signals which identify or demand a call connection. In response to the dial signals, the central coordinator Z determines which partial switching matrices and thus which associated control systems are required to participate in the establishment of the demanded call connection.

The central coordinator Z, in addition, may also carry out additional tasks. For example, the central coordinator Z may include auxiliary systems to effect conversion of the data received from either the receiving or the transmitting transmission line repeaters. In the alternative, this conversion may also be effected by the control systems individually assigned to the partial switching matrices.

Upon completion of the pathfinding, the establishment of coupling connections through the partial switching matrices participating in a given call connection is performed by individual setting means assigned to each such partial switching matrix. In the selected example, the setter EST11 completes the coupling connection through its associated partial switching matrix TKF11.

In the following description of the operation of the installation of the invention, it will be assumed that a dial information code demanding a call connection is presented on a line connected to the repeater U101. The receiving repeater U101 is seized in response to the connection demand. The state of seizure is recognized by the scanner S10. The scanner S10, as shown, is connected to all of the repeaters such as U101 to U10*n* associated with a given partial switching matrix such as TKF10 and may effect a suitable scan in a cylical manner, through well-known techniques, for sampling the state of each of the associated repeaters. When such a state of seizure is recognized by the scanner S10, the identity of the seized repeater, such as U101, is transmitted to and recognized by the control system ST10. The control system ST10 includes register means which are associated with the repeaters connected to the partial switching matrix TKF10 and in which a change in the seizure condition, such as that occurring in repeater U101 upon receipt of the call connection demand, is registered.

The scanner S10, in addition to recognizing a change in the seizure condition of a repeater, may also perform other functions. For example, in systems employing impulse dialing, the scanner S10 may recognize the receipt of dial signals in a given repeater. Similarly, with multifrequency or tone dial systems, the scanner S10 may also recognize a change in condition occurring at a repeater upon receipt of tone dial information.

In response to the determination by scanner S10 of a change in condition of the repeater U101, the control system ST10 establishes a connection between the repeater U101 and the receiver-transmitter over the coupler K10. The dial signals thereupon received by the repeater U101 are transmitted through the coupler K10 and the receiver portion of receiver-transmitter to the control system ST10. The dial signals are registered in the control system ST10 in register positions thereof assigned to the repeater U101.

When a sufficient number of dial signals have thus been registered in the register positions of the control system ST10 assigned to the repeater U101 for identifying the required coupling connection over the switching matrix, pathfinding is initiated by the control system ST10. As noted previously, the central coordinator Z effects the coupling together of the pathfinders or the control systems required to participate in the establishment of the demanded call connection. For this purpose, the dial information registered in the control system, as described, is transmitted through the coupler KST to the central coordinator Z.

The central coordinator Z may receive the dial signals themselves or appropriate data relating to the dial signals. The central coordinator then performs an inquiry function to determine the identity of a partial switching matrix of the second group thereof having an external line corresponding to the traffic route of the demanded call connection. For purposes of this example, it will be assumed that the partial switching matrix TKF21 has connected thereto an external line corresponding to the traffic route of the demanded call connection. Simultaneously with the determination of the appropriate partial switching matrix of the second group required for the demanded call connection, the central coordinator Z also determines the pathfinders which are to participate in pathfinding for the demanded call connection. In the current example, the pathfinders W10 and W21 are therefore selected. The coordinator Z then connects the pathfinders W10 and W21 over the coupler KW.

The pathfinding can now be performed in any suitable, well-known manner. For example, the pathfinding may be effected over a pathfinding network proceeding parallel to the speaking path network. In the alternative, the pathfinding may be performed in pathfinding registers. For this latter operation, the pathfinders, such as W10 and W21, may contain registers having positions which indicate the condition of the possible coupling paths through the respectively associated partial switching matrices TKF10 and TKF21. Where registers are employed for performing the pathfinding, the terminals of the partial switching matrices between which coupling paths may be established may be identified as fixed independent positions, each identified by a corresponding value. The pathfinding then can be effected efficiently and with simplified circuits since only the values representing the terminals of the partial switching matrix need be scanned and identified in relation to one another for establishing the current existing and available speaking circuits or paths through the partial switching matrix.

The speaking connection or coupling connection through a given partial switching matrix is established after completion of the pathfinding. For this purpose, each partial switching matrix includes a setting means which is controlled by the associated pathfinder. Thus, in the current example, the setters EST10 and EST21 are controlled by the pathfinders W10 and W21 to establish the appropriate speaking or coupling connections through the associated partial switching matrices TKF10 and TKF21.

The central coordinator Z and the couplers KW and KST may establish other connections during the operation of pathfinders W10 and W21 in accordance with the operation set forth above. These connections may also serve for the purpose of pathfinding or for other suitable purposes. As noted previously, each of the first and second groups of partial switching matrices includes a plurality of partial switching matrices and associated systems, such as pathfinders and control systems. In the illustrated embodiment of the invention, only two such partial switching matrices are shown in each group thereof. In the following example, therefore, the additional connection established during the pathfinding functions of pathfinders W10 and W21 will be assumed to be established between the control systems ST11 and ST20 associated with the partial switching matrices TKF11 and TKF20.

As an example of the operation occurring in such an additional connection, it will be assumed that a return signal, i.e. a signal indicating receipt of a call connection at a remote subscriber station or remote exchange installation is received in repeater U201. Repeater U201 is switched or coupled to repeater U111, as a result of prior completion of a coupling connection therebetween. Further, the connection line associated with repeater U111 may be connected to a predetermined exchange installation rather than to a subscriber. In this regard, it should be noted that although previously the connection lines associated with the first group of switching matrices were discussed as providing connections to local subscriber stations, some or all of these lines, in the alternative, may provide connections to local exchange offices.

The receipt of the return signal in repeater U201 causes the latter to change to a condition of seizure. The changed condition is recognized by scanner S20 and is announced to the control system ST20. In accordance with the previous discussion of operation of establishing a call connection, information was registered in the control system ST20 or, in the alternative, in the pathfinder W20, identifying the previously completed coupling connection between the repeaters U111 and U201. In response to the recognition of the changed condition of the repeater U201 by scanner S20, the control system ST20 thereupon requests that a connection be completed to the control system ST11 over coupler KST.

The receipt signal received by repeater U201 is transmitted through coupler K20 to receiver-transmitter ES20 and is transmitted by control system ST20 over coupler KST to control system ST11. In response thereto, control system ST11 establishes a connection between receiver-emitter ES11 and repeater U111 over coupler K11. The receipt signal is thereby transmitted to the line associated with repeater U111.

In accordance with the foregoing description of operation, the establishment of connections between the pathfinders over the coupler KW and between the control systems over the coupler KST is effected under the control of central coordinator Z. However, in accordance with an alternative embodiment of the invention, and as previously mentioned, the couplers KW and KST may be constructed as a single coupler. In such an alternative embodiment, the central coordinator Z may control a special control circuit or may include the necessary circuits itself, whereby there may be established simultaneously the requisite coupling connections between both the pathfinders and the control systems of the various partial switching matrices of the installation.

The provision of a plurality of first and second groups of partial switching matrices in accordance with the installation of the invention provides a very advantageous feature of insuring continuous operation of the entire installation regardless of failure of component portions thereof. For example, upon the failure of a control system such as ST11 of the group including the control systems ST11 to ST10, another control system such as ST10 or a portion of one or more other control systems of this same group of partial switching matrices may perform the functions of the failing control system ST11. The provision of the couplers KW and KST and the central coordinator Z of the central control system provide a further protection against failure in the system. For example, should the central coordinator Z fail, an emergency program can be established for maintaining coupling connections over the switching matrices. This emergency program is permitted due to the fact that the control systems individually assigned to the plurality of partial switching matrices, as well as the associated pathfinders, are connected over the couplers KST and KW in accordance with a fixed program.

A significant advantage of the installation of the invention is provided by the capability of designing the installation to be of any desired load handling capacity and for subsequently modifying capacity, normally by way of increasing it, without disrupting the system operation and without effecting the speed of operation. For example, when a small exchange office is initially established, sufficient load handling capacity may be provided by only a single partial switching matrix. In this regard, it will be recognized that both local and external connection lines may be connected to the same side of the switching matrix, as well as in the case of a larger installation having a plurality of such matrices. Further, as the demands for connections and the number of subscribers increase at a given exchange office, the capacity of the system may be increased through the addition of further partial switching matrices.

In summary, the telephone exchange installation of the invention provides rapid and efficient operation in performing pathfinding functions and for establishing coupling connections for completing demanded call connections. The provision of individual control systems, pathfinders, and other systems with each of a plurality of partial switching matrices assures that the speed with which coupling connections are established is maintained within required limits. Further, the provision of the individually assigned control systems provides a safeguard against failure of one or more of the individual control systems of a given group by the capability of employing others of the control systems associated with the same group of partial switching matrices for performing the function of the failing control system. In addition, the plurality of partial switching matrices and individually assigned control systems enables increasing the load handling capacity of the installation without affecting the service provided by the existing installation.

It will be evident that many changes could be made in the systems of the invention without departure from the scope thereof. Accordingly, the invention is not to be considered limited to the particular embodiment disclosed herein, but only by the scope of the appended claims. It is therefore intended by the appended claims to cover all such modifications and adaptations as fall within the true spirit and scope of the invention.

What is claimed is:

1. A telephone exchange installation for performing pathfinding and establishing call connections between a first connection line associated with a calling subscriber and a second connection line associated with a called subscriber, comprising:

- a composite switching matrix comprising a plurality of partial switching matrices connected in a first group (TKF11 to TKF10) and a second group (TKF21 to TKF20), said first connection lines (111 to **10*n***) being connected to input terminals of said partial switching matrices (TKF11 to TKF10) of said first group and said second connection lines being connected to output terminals of said partial switching matrices of said second group (TKF21 to TKF20),
- a plurality of control systems (ST11 to ST20) individually assigned to corresponding ones of said partial switching matrices (TKF11 to TKF20) for controlling pathfinding and establishing of call coupling connections in the associated partial switching matrices (TKF11 to TKF20), and
- a central coordinator (Z) for simultaneously selecting the control systems (ST10 and ST21) required to participate in the pathfinding function for establishing a call connection (from U101 to U211) or terminating a previously established call connection.

2. A telephone exchange installation as recited in claim 1 further comprising:

- a plurality of transmission line repeaters (U111 to U20*n*) connected through corresponding ones of said connection lines (111, **10*n*** . . . ) to corresponding input and output terminals of said plurality of partial switching matrices (TKF11 to TKF20), said plurality of control systems (ST11 to ST20) supervising the condition of the transmission line repeaters (U111 to U20*n*) connected to the respectively associated partial switching matrices (TKF11 to TKF20) for recognizing and responding to information received thereby for effecting the establishment of call connections and the termination of previously established call connections and for effecting the transmission of data thereover.

3. A telephone exchange installation as recited in claim 2 further comprising:

a plurality of scanning systems (S11 to S20) respectively associated with said partial switching matrices (TKF11 to TKF20) and with the corresponding, individually assigned control systems (ST11 to ST20) for indicating to the latter a condition of seizure of the corresponding transmission line repeaters (U111 to U20*n*).

4. A telephone exchange installation as recited in claim 3 wherein there is further provided:

a plurality of couplers (K11 to K20) and receiver-transmitters (ES11 to ES20), respectively associated with said plurality of partial switching matrices (TKF11 and TKF20), each of said couplers (K11) and receiver-emitters (ES11) being connectable in circuit with the plurality of transmission line repeaters (U111 to U11*n*) connected to the corresponding partial switching matrix (TKF11) and with the corresponding, individually assigned control system (ST11), and each of said control systems (ST11) responding to the indication of seizure by said associated scanner (S11) for controlling said associated coupler (K11) to establish a coupling connection therethrough for receipt of information demanding a call connection and for transmission of information of a demanded call connection.

5. A telephone exchange installation as recited in claim 2 wherein:

said composite switching matrix includes a plurality of switching stages (K1 to K6) in the direction of coupling connections between said input and output terminals thereof, and said partial switching matrices of said first group (TKF11 to TKF10) and said second group (TKF21 to TKF20) include an equal number of switching stages.

6. A telephone exchange installation as recited in claim 5 wherein there is further provided:

means for connecting the control systems (ST11 to ST10) of one group of partial switching matrices (TKF11 to TKF10) together for enabling control of a given partial switching matrix (TKF10) by the control system (ST11) of another partial switching matrix (TKF11) in the event of failure of operation of the control system (ST10) individually assigned to the given partial switching matrix (TKF10).

7. A telephone exchange installation as recited in claim 2 wherein there is further provided:

a coupler (KST) connected to said control systems (ST11 to ST10) of said first group and to said control systems (ST21 to ST20) of said second group, and said central coordinator (Z) controls said coupler (KST) in accordance with recognition of the traffic route of a demanded call connection for establishing a coupling path through said coupler (KST) and between the corresponding ones of said control systems (ST10 and ST21) associated with the partial switching matrices (TKF10 and TKF21) connected to the connection line receiving the call connection demand and that of the desired traffic route.

8. A telephone exchange installation as recited in claim 2 wherein there is further provided:

a plurality of pathfinders (W11 to W20) respectively associated with said plurality of partial switching matrices (TKF11 to TKF20) and controlled by the corresponding one of the plurality of individually assigned control systems (ST11 to ST20) to effect pathfinding through the corresponding one of the plurality of partial switching matrices (TKF11 to TKF20) for completing coupling connections therethrough in response to a demanded call connection.

9. A telephone exchange installation as recited in claim 8 wherein there is further provided:

a coupler (KW) connected to said pathfinders (W11 to W10) of said first group and to said pathfinders (W21 to W20) of said second group, and said central coordinator (Z) controlling said coupler (KW) in accordance with recognition of the traffic route of a demanded call connection for establishing a coupling path through said coupler (KW) and between the corresponding ones of said pathfinders (W10 and W21) associated with the partial switching matrices (TKF10 and TKF21) connected to the connection line receiving the call connection demand and that of the desired traffic route for effecting pathfinding therethrough to establish a speaking path connection.

No references cited.

WILLIAM C. COOPER, Primary Examiner